(12) United States Patent
Kenefick (10) Patent No.: US 11,354,409 B1
(45) Date of Patent: Jun. 7, 2022

(54) MALWARE DETECTION USING LOCALITY SENSITIVE HASHING OF API CALL SEQUENCES

(71) Applicant: Trend Micro Inc., Tokyo (JP)

(72) Inventor: Ian Kenefick, Cork (IE)

(73) Assignee: TREND MICRO INC., Tokyo (JP)

( * ) Notice: Subject to any disclaimer, the term of this patent is extended or adjusted under 35 U.S.C. 154(b) by 245 days.

(21) Appl. No.: 16/787,204

(22) Filed: Feb. 11, 2020

(51) Int. Cl.
*G06F 21/55* (2013.01)
*G06F 21/56* (2013.01)
*G06F 9/54* (2006.01)

(52) U.S. Cl.
CPC ............ *G06F 21/554* (2013.01); *G06F 9/547* (2013.01); *G06F 21/564* (2013.01); *G06F 21/566* (2013.01)

(58) Field of Classification Search
CPC ...... G06F 21/554; G06F 9/547; G06F 21/564; G06F 21/566; G06F 21/55; G06F 21/56
See application file for complete search history.

(56) References Cited

U.S. PATENT DOCUMENTS

| | | | |
|---|---|---|---|
| 2007/0220043 A1* | 9/2007 | Oliver | H04L 63/104 |
| 2019/0199736 A1* | 6/2019 | Howard | G06N 20/00 |
| 2019/0319978 A1* | 10/2019 | Giffard | G06F 16/2255 |

FOREIGN PATENT DOCUMENTS

FR 2907934 A1 * 5/2008 ........... G06F 21/105

OTHER PUBLICATIONS

TLSH—A Locality Sensitive Hash, Jonathan Oliver, Dec. 11, 2019, Academia.edu.
Malware Characterization using Windows API Call Sequences, Sanchit Gupta, 2016.

* cited by examiner

*Primary Examiner* — Jayesh M Jhaveri
(74) *Attorney, Agent, or Firm* — Beyer Law Group LLP (57) ABSTRACT

An agent on an endpoint computer computes a locality-sensitive hash value for an API call sequence of an executing process. This value is sent to a cloud computer which includes an API call sequence blacklist database of locality-sensitive hash values. A search is performed using a balanced tree structure of the database using the received hash value and a match is determined based upon whether or not a metric distance is under or above a distance threshold. The received value may also be compared to a white list of locality-sensitive hash values. Attribute values of the executing process are also received from the endpoint computer and may be used to inform whether or not the executing process is deemed to be malicious. An indication of malicious or not is returned to the endpoint computer and if malicious, the process may be terminated and its subject file deleted.

21 Claims, 8 Drawing Sheets

FIG. 1

| Order | API | Technique |
|---|---|---|
| 0 | CreateMutexW | Possible Suspicious Mutex Creation |
| 1 | CryptDeriveKey | Possible Malicious Use of Encryption |
| 2 | CryptDecrypt | Possible Malicious Use of Encryption |
| 3 | CreateProcessW | -- |
| 4 | WriteProcessMemory | Code Injection |
| 5 | WriteProcessMemory | Code Injection |
| 6 | SetThreadContext | Process Hollowing set new EntryPoint |
| 7 | NtResumeThread | Process Hollowing execute malicious payload |
| 8 | CreateMutexW | Possible Suspicious Mutex Creation |
| 9 | NtResumeThread | Process Hollowing execute malicious payload |
| 10 | CreateProcessW | -- |
| 11 | OpenServiceW | Possible Privilege Elevation |
| 12 | OpenServiceW | Possible Privilege Elevation |
| 13 | OpenServiceW | Possible Privilege Elevation |
| 14 | OpenServiceW | Possible Privilege Elevation |
| 15 | WaitForSingleObject | APC Injection or Atombombing |
| 16 | GetAsyncKeyState | Possible KeyLogging or Evasion |
| 17 | GetAsyncKeyState | Possible KeyLogging or Evasion |
| 18 | GetAsyncKeyState | Possible KeyLogging or Evasion |
| 19 | GetAsyncKeyState | Possible KeyLogging or Evasion |
| 20 | GetAsyncKeyState | Possible KeyLogging or Evasion |
| 21 | socket | Network Activity |
| 22 | socket | Network Activity |
| 23 | CreateMutexW | Possible Suspicious Mutex Creation |
| 24 | CreateMutexW | Possible Suspicious Mutex Creation |
| 25 | CreateMutexW | Possible Suspicious Mutex Creation |
| 26 | CreateMutexW | Possible Suspicious Mutex Creation |
| 27 | CreateMutexW | Possible Suspicious Mutex Creation |
| 28 | CreateMutexW | Possible Suspicious Mutex Creation |
| 29 | CreateMutexW | Possible Suspicious Mutex Creation |
| 30 | CreateMutexW | Possible Suspicious Mutex Creation |
| 31 | CreateMutexW | Possible Suspicious Mutex Creation |
| 32 | CreateMutexW | Possible Suspicious Mutex Creation |
| 33 | CreateMutexW | Possible Suspicious Mutex Creation |

*FIG. 2*

| 34 | socket | Network Activity |
| 35 | socket | Network Activity |
| 36 | socket | Network Activity |
| 37 | DnsQueryExW | DNS Network Activity |
| 38 | DnsQueryExW | DNS Network Activity |
| 39 | socket | Network Activity |
| 40 | connect | Network Activity |
| 41 | IWbemLevel1Login::NTLMLogin | WMI Services access attempt |
| 42 | IWbemLocator::ConnectServer | WMI Services connection attempt |
| 43 | IWbemServices::ExecQuery | WMI Services Query Execution |
| 44 | Win32_OperatingSystem::Get | Possible System Profiling |
| 45 | Win32_OperatingSystem::Get | Possible System Profiling |
| 46 | Win32_OperatingSystem::Get | Possible System Profiling |
| 47 | send | Network Activity |
| 48 | send | Network Activity |
| 49 | send | Network Activity |
| 50 | EnumProcesses | Possible Malicious Process Enumeration |
| 51 | NtQuerySystemInformation | Possible System Profiling |
| 52 | NtQuerySystemInformation | Possible System Profiling |
| 53 | NtQuerySystemInformation | Possible System Profiling |
| 54 | NtQuerySystemInformation | Possible System Profiling |
| 55 | NtQuerySystemInformation | Possible System Profiling |
| 56 | NtQuerySystemInformation | Possible System Profiling |
| 57 | NtQuerySystemInformation | Possible System Profiling |
| 58 | NtQuerySystemInformation | Possible System Profiling |
| 59 | NtQuerySystemInformation | Possible System Profiling |

*FIG. 2 (CONT.)*

| sha256 | tlsh | is_clustered | cluster_id |
|---|---|---|---|
| cd0b73bb1e0f1307901159e46f0bc5384acbdbb82f6a2749ca3e71d1f8f8f7a9 | 6511577597561D654AA323304FCC2619AA8003D123CEE562DC8E18FA6C699C33AD3E9 | 1 | 21 |

*FIG. 3*

FIG. 4
Tree Data Structure

MALWARE DETECTION USING LOCALITY SENSITIVE HASHING OF API CALL SEQUENCES

FIELD OF THE INVENTION

The present invention relates generally to detection of malicious software on an endpoint computer. More specifically, the present invention relates to generating a fuzzy hash value for a sequence of API calls from suspicious software.

BACKGROUND OF THE INVENTION

As computers and other computing devices become more prevalent, attacks on those computers via malicious software, or malware, are more common; continuing efforts are needed to detect and remove that malware. Typically, malware authors use evasion techniques to defeat static (i.e., pre-execution) malware detection technologies (e.g., signatures, heuristics, static machine learning model approaches). Such techniques may include the use of encryption, encoding, code obfuscation and run-time packing programs.

Run-time detection techniques are based upon the premise that malicious code will eventually perform malicious behaviors—irrespective of how a malware author attempts to mask a malware files' malicious routines using pre-execution evasion techniques. In the case of malware written as Microsoft Windows Portable Executable (PE) files, these behaviors may include certain API call sequences that are unique to malicious programs and may be used to identify such malware explicitly or as a weighted feature in an algorithm that identifies malware. Not surprising, malware authors attempt to defeat detection of malicious API call sequences by intentionally inserting benign or deceptive API calls in the malware in order to evade runtime detection of malicious sequences.

A number of prior art techniques may be used to detect malicious API call sequences (and attempt to ignore the benign or deceptive API calls), but none are optimal. By way of example, API call sequence hashing using digests (e.g., SHA1, SHA256) lacks sufficient flexibility to detect minor variations in behavior patterns. A single change in the API call sequence will produce a different hash value which would render such detection techniques ineffective and make it trivial for malware authors to evade such a technique.

Other similarity digests such as SSDEEP (a fuzzy hash program for computing Context Triggered Piecewise Hashes), SDHASH (a similarity digest) and Nilsimsa (a locality-sensitive hash) may also be ineffective. These other digests may address the issue of variation in the API call sequence—but are not suitable for our application as they do not support fast search using decision tree's and recursive partitioning—and therefore cannot scale to use cloud queries for real-time run-time malware detection. Also, SSDEEP and SDHASH are prone to well-documented attacks. Further, with SDHASH and SSDEEP, if you take two random items, 99%+ of the time you will get a similarity score of zero.

The resulting decision trees with SDHASH and SSDEEP are unbalanced and therefore very deep. This makes them very slow with performance akin to linear search. For example, a tree with one million digests may have one half of the tree (from the root) with only ten values, while the other half has 999,990 values. This results in a tree with a depth of approximately 100,000 which is very slow.

Most similarity digests cannot identify files as being similar if the files are encrypted, compressed, packed by malware or encoded. Unpacking, decompressing or decrypting must be performed first.

Accordingly, techniques and a system are desirable for real-time detection of malicious software as it is executing that can scale to perform in-the-cloud queries in real time.

SUMMARY OF THE INVENTION

To achieve the foregoing, and in accordance with the purpose of the present invention, malware detection uses using locality-sensitive hashing (LSH) of API call sequences in order to achieve a scalable in-the-cloud system. It is recognized that such locality-sensitive hashing has advantages. In particular, the algorithm Trend Locality Sensitive Hashing (TLSH) has distinct advantages over other algorithms. For one, TLSH outperforms (i.e., more accurate, faster hash computation, faster distance calculation, and faster search) SSDEEP and SDHASH while maintaining excellent error rates in its implementation. Also, testing shows Nilsimsa's true positive/false positive rate is unacceptably high when compared to that of TLSH.

In addition, one important advantage of the TLSH is that it uses a distance metric to compare two hash values (i.e., two digests) when determining if the two hash values should be considered similar or close. Both SSDEEP and SDHASH use a similarity score between digests which ranges from 0 up to 100, which presents problems for both those approaches. Further, recursive partitioning is used in TLSH to build a decision tree which enables fast search. Because TLSH has been designed to have a wide scoring range (a metric), this is possible.

Nilsimsa also restricts its scores to the range of 128-256, and rarely goes below 128. Use of a distance metric avoids those problems and also allows use of a distance threshold (i.e., a threshold below which digests may be considered similar and above which digests may be considered different). The ability to select a distance threshold enables trade-offs to be made between false positive rates and detection rates. It is also further realized that use of the distance metric (or an approximate distance metric) and a distance threshold with any locality-sensitive hashing (LSH) algorithm provides the benefits discussed herein; the invention is not limited to the TLSH.

Further, use of a distance metric for comparing two digests allows search trees to be built when comparing a subject digest with a database of potentially matching digests. Use of a locality-sensitive hash and a distance metric for comparison results in balanced search trees, meaning that the search may be conducted far faster than with a search tree that is unbalanced. The invention works well with metric trees and with a vantage point tree in particular.

Another advantage of TLSH is that unlike other fuzzy hashing algorithms, one can create a scalable system, e.g., an in-the-cloud reputation system, because TLSH supports fast search, and thus the system is highly scalable. No other fuzzy hash algorithm has both of these properties, namely, accurate and supports fast search. Thus, API call sequences can be captured by an agent during runtime and are queried against an in-the-cloud pattern using a fast search. One approach to fast search is to use a distance metric (or an approximate distance metric) that is calculated between two hash values; the digests SSDEEP and SDHASH do not use a distance metric and thus one cannot build trees or fast indexes using the hash values from these two digests.

Attempts to build search trees using these two algorithms end up being linked lists and not balanced trees, resulting in a very slow search.

Malware detection using locality-sensitive hashing of API call sequences addresses the evasion problem by allowing for variations in the API call sequence string, thus allowing malware that uses evasion to be detected. One key feature is the ability to perform these queries as an in-the-cloud query, so that it is not necessary to maintain and release large pattern files to endpoint computers. This type of query makes it easy to monitor for abuse, quick to update the backend pattern, and creates an attack surface which is harder to evade. This approach also protects the privacy of end users since only a hash value is sent to the backend server. If the hash value indicates suspicious or malicious software, then appropriate actions can be taken.

Advantages of the above embodiments include: proactive runtime detection of malware; the ability to quickly update or add new malicious behaviors within a reasonably short amount of time in order to address these new malicious behaviors; the ability to include the API call sequence verdict as a feature in a detection algorithm, thus leveraging additional context; endpoint detection and detection (retrospective identification of potentially malicious activity); and performing the above with an in-the-cloud query using a backend reputation system.

In a first embodiment, an agent on an endpoint computer monitors API calls of an executing process and collects a number of these API calls into an API call sequence. Next, these API calls are concatenated together and a locality-sensitive hash is calculated for this string to produce a value. The value is sent during run-time of the executing process and in real time to a blacklist database in the cloud. The blacklist database includes locality-sensitive hash values that each also represent a sequence of API calls. A search is performed and if this value matches one of the entries in the database then an indication is returned from the cloud computer that the executing process is malicious.

In a second embodiment, a security server on a cloud computing computer receives over a network connection from a remote endpoint computer a locality-sensitive hash value that has been computed from an API call sequence of an executing process. A blacklist database in association with the cloud computing computer also includes locality-sensitive hash values, each of these values representing a known malicious API call sequence. The server uses a distance metric or approximate distance metric to calculate a distance between the received value and each of the values in the blacklist database, preferably using a balanced tree structure to perform the search. If any of the distances are below a distance threshold than a match exists and a response is sent back to the endpoint computer indicating that the exiting processes malicious.

In a third embodiment, an agent on an endpoint computer computes a locality-sensitive hash value for an API call sequence of an executing process. This value is sent to a cloud computing computer which includes an API call sequence blacklist database. A search is performed of the database using the received hash value and a match is determined based upon whether or not a metric distance is under or above a distance threshold. Attribute values of the executing process are also received from the endpoint computer and may be used to inform whether or not the executing process is deemed to be malicious. An indication of malicious or not is returned to the endpoint computer.

BRIEF DESCRIPTION OF THE DRAWINGS

The invention, together with further advantages thereof, may best be understood by reference to the following description taken in conjunction with the accompanying drawings in which.

We should not include the 'technique' column though.

DETAILED DESCRIPTION OF THE INVENTION

As mentioned above, the present invention is able to monitor API (application programming interface) calls of an executing file and determine if that file is malicious or not. During execution, a Microsoft Windows portable executable (PE) file will invoke a series of API calls during its run time which represents how that file behaves; this series of API calls is referred to as the API call sequence. By way of example, invocation of a certain sequence of API calls may indicate process injection, cryptographic API invocation, network activity followed by file system manipulation, which sequence may be indicative of ransomware activity.

Other examples of malicious software (followed by the API call sequence that is indicative of that malware) are: Key Logger (FindWindowA, ShowWindow, GetAsyncKeyState) (SetWindowsHookEx, RegisterHotKey, GetMessage, UnhookWindowsHookEx); Screen Capture (GetDC, GetWindowDC), CreateCompatibleDC, CreateCompatibleBitmap, SelectObject, BitBlt, WriteFile; Antidebugging (IsDebuggerPresent, CheckRemoteDebuggerPresent, OutputDebugStringA, OutputDebugStringW); Downloader (URLDownloadToFile, (WinExec,ShellExecute)); and DLL Injection (OpenProcess, VirtualAllocEx, WriteProcessMemory, CreateRemoteThread).

Figure 1:
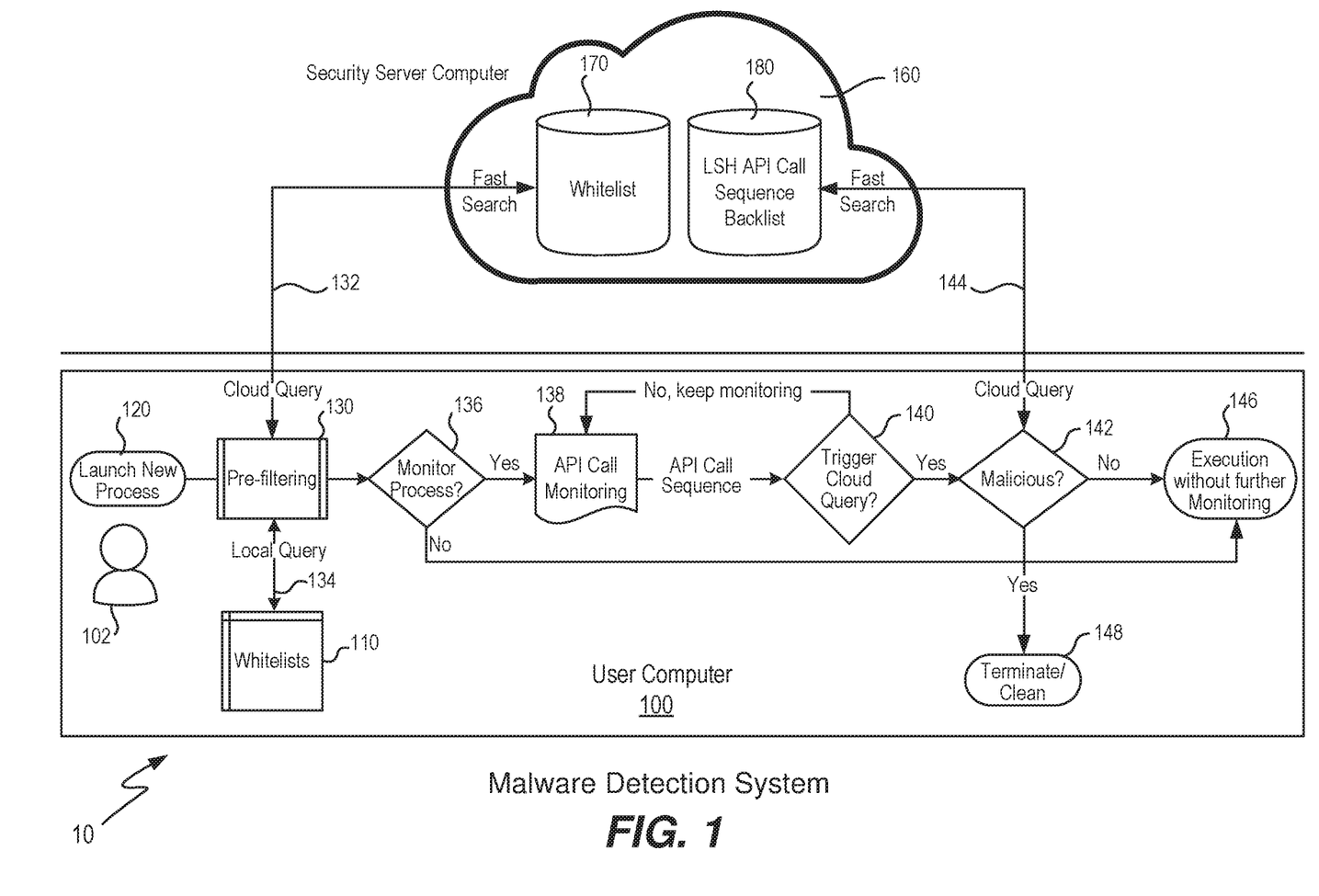
FIG. 1 is illustrates a malware detection system according to one embodiment of the invention.

FIG. 1 illustrates a malware detection system 10 according to one embodiment of the invention. Shown symbolically is a user computer 100 that is operated by a user 102 and which includes a local whitelist database 110. Server computer 160 is typically a cloud-based computer including appropriate software that implements not only a white list database 170 but also an LSH API call sequence blacklist 180.

The computer 100 may launch a new executable process 120 at a given point in time. Modules 130-148 are performed by a malware detection agent (MDA) which runs on the user endpoint computer and supports hooking of API calls. A resident endpoint security agent or a virtual analyzer component of a sandbox with user-mode API hooking capabilities may also be used instead of the MDA. In any case, software executing upon user computer 100 is arranged to execute modules 130-148. API hooking is well known to those of skill in the art and its implementation in the antivirus software MDA will be straightforward. As will be explained in greater detail below, these modules of the MDA are also responsible for invoking queries to the cloud backend server computer 160 which will return a malicious/ not malicious verdict. The MDA is also responsible for calling a damage cleanup engine (not shown) on the user computer which will be responsible for terminating any malicious process.

The local white list database 110 includes a variety of white lists and serves to minimize false alarms and unneeded overhead as a result of process monitoring when the system is active. By way of example, database 110 may include a list of digests such as SHA256 values, identifiers for digitally-signed files, hash values from fuzzy representation algorithms, resource values, and other identifiers that uniquely identify files (or families of files) that are known to be benign. By using database 110 to perform an optional pre-filtering step, false positives may be prevented. Implementing database 110 locally on the user computer 100 means that fewer resources are needed and the filtering is performed faster.

White list database 170 supports fast search and is comprised of known good sequences which can be updated frequently through automated mechanisms or by human experts. Database 170 is a white list of LSH values of API call sequences.

Blacklist database 180 also supports fast search and is comprised of hash values of known malicious sequences which can be updated as frequently as needed through automated mechanisms or by human experts. Thus, when an unknown process is executing upon the user computer the MDA will capture its API call sequence and then calculate the locality-sensitive hash value for that call sequence. As will be described in greater detail below, this hash value is a fuzzy hash representation of the behavior of the executing process. In general, designating (or tagging) hash values as benign (and placing them into a white list database) or as malicious (and placing them into the blacklist database) can be done by human experts or can be automated using expert rules. Preferably, these hash values in database 180 are organized into a tree structure as shown in FIG. 4 in order to implement a fast search.

Figure 2:
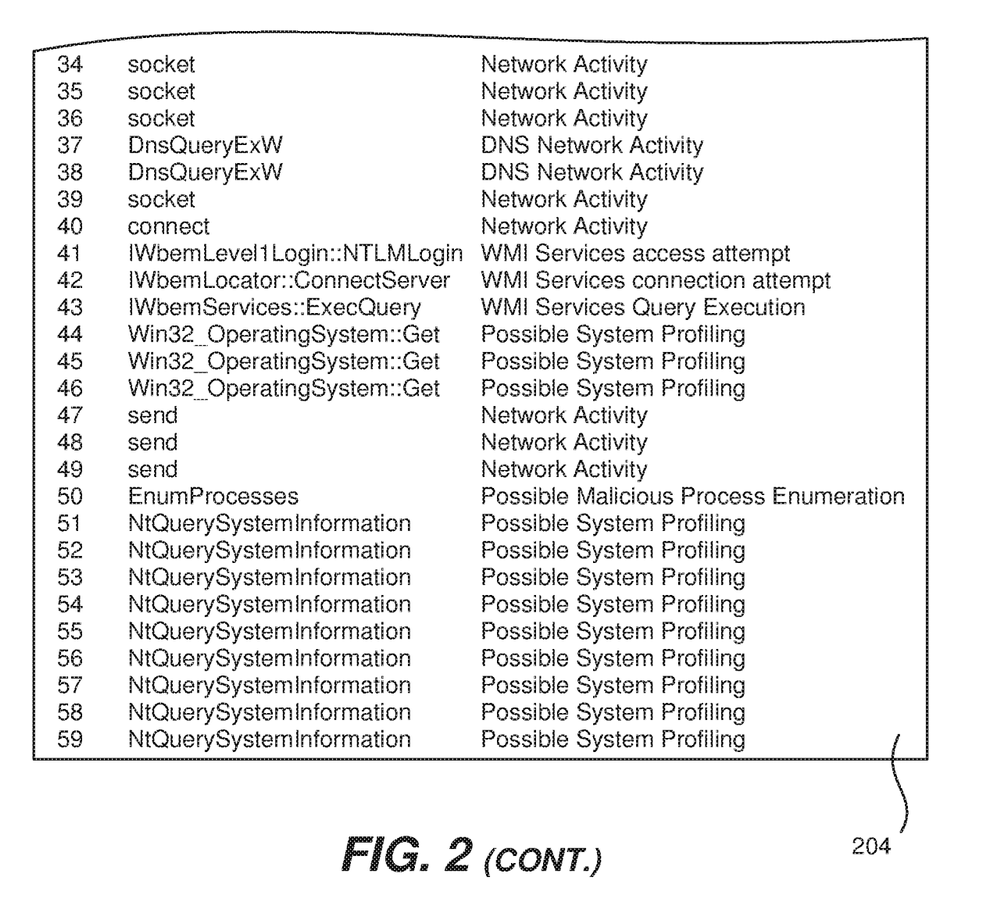
FIG. 2 is a table listing a collection of API calls in order of execution.

FIG. 2 is a table 204 listing a collection of API calls in order of execution. Order matters as the order impacts the TLSH value. In this example, the listed API calls represents an API call sequence for an AutoIT malware sample with backdoor functionality. Column 212 lists the order (from 0 up to 59) of each API call made by the subject file. Column 216 lists, in order, each API call made by that file when it is executing; and, column 220 lists a possible suspicious activity that may be performed by each corresponding API call. The API calls (or a subset) in column 216 may be concatenated together to form an API call sequence for further processing.

Figure 3:
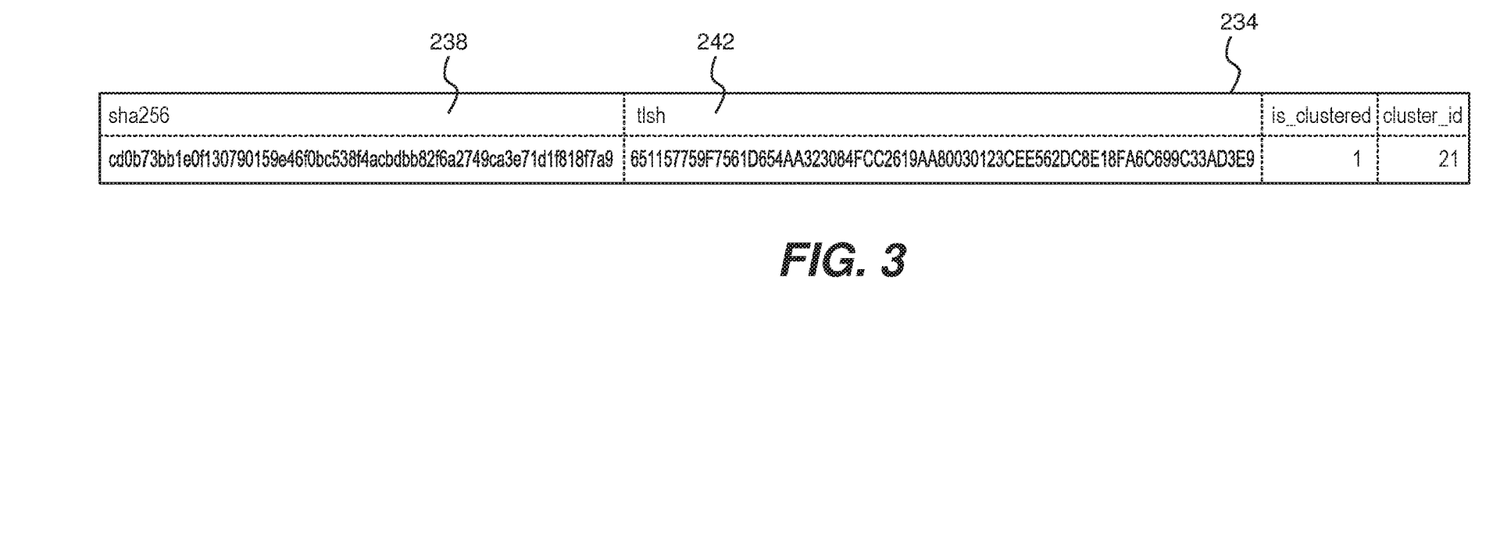
FIG. 3 is a table listing two hash values.

FIG. 3 is a table 234 listing two hash values. Value 238 is the SHA256 hash value for the subject file and value 242 is a calculated TLSH value based upon the concatenated API call sequence from column 216 above. As will be explained in greater detail below, the TLSH value is a locality-sensitive hash value that can detect similarities between LSH values of other API call sequences. By way of example, the concatenated API call sequence from column 216 has 14 "CreateMutex" API calls. If there were a similar second file that only had 12 "CreateMutex" API calls, but also performed the same malicious backdoor behavior, the calculated TLSH value for this similar file would be very similar to the TLSH value 242 of the original file. Thus, based upon the similarity of the TLSH values, it may be determined that the second file is also malicious. A traditional hashing algorithm would produce quite different hash values between the two files.

Figure 4:
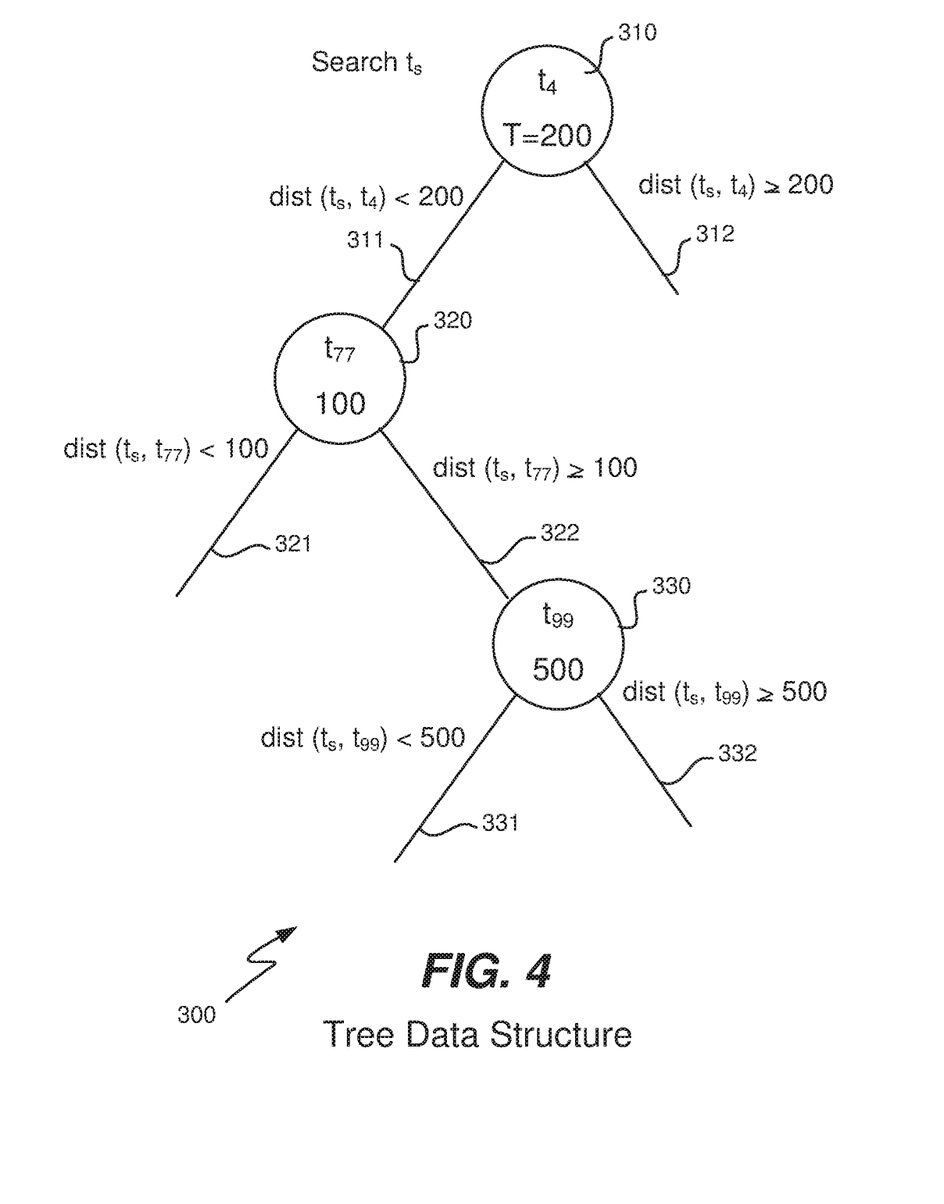
FIG. 4 illustrates a tree data structure used to implement a fast search algorithm.

FIG. 4 illustrates a decision tree used to implement a fast search algorithm and search will be described in greater detail below. Generally, a decision tree is a flowchart-like structure in which each internal node represents a "test" on an attribute; each branch represents the outcome of the test. As shown in FIG. 4, tree 300 has nodes 310, 320, 330, etc. (other nodes not shown for clarity). Inputs are hash values t1, t2, t3, t4, t5, t6 . . . t10000, etc., which are used to build the tree. In a search for the hash value ts, a comparison is performed with a value at each node. E.g., at node 310, a distance is calculated between ts and t4, if less than 200, the control branches to 311 and down to node 320. If the distance is greater than or equal to 200, then control branches down 312 to a different node. Similar comparisons are made at nodes 320 and 330. Preferably, the tree is balanced, having approximately 50% of values left, and, 50% of the values right of a given node.

To build a tree, recursive partitioning is used. The criteria to split values for building the tree is as follows. First, select a value/distance such that roughly 50% of the values go left and 50% go right of a node. This is straightforward to do because TLSH is designed to have a wide scoring range. Once you have selected an item, then you can search through the distance scores until you have a distance threshold so that roughly 50% go left and roughly 50% go right of the node. You continue down the tree. A fast search can then be performed on the tree using an approximate nearest neighbour algorithm. For example, with one million items, the depth will be 20, meaning only 20 comparisons are needed to get to a leaf.

Because each tree and search is dependent on the choice of value at the root, one embodiment builds a forest of such trees, each having a different value at the root. During search, each tree is searched, requiring more memory, and is slower. But, the nearest neighbor algorithm becomes more accurate. It is a design decision to use only one tree or numerous trees.

Flow Diagram

Figure 5A:
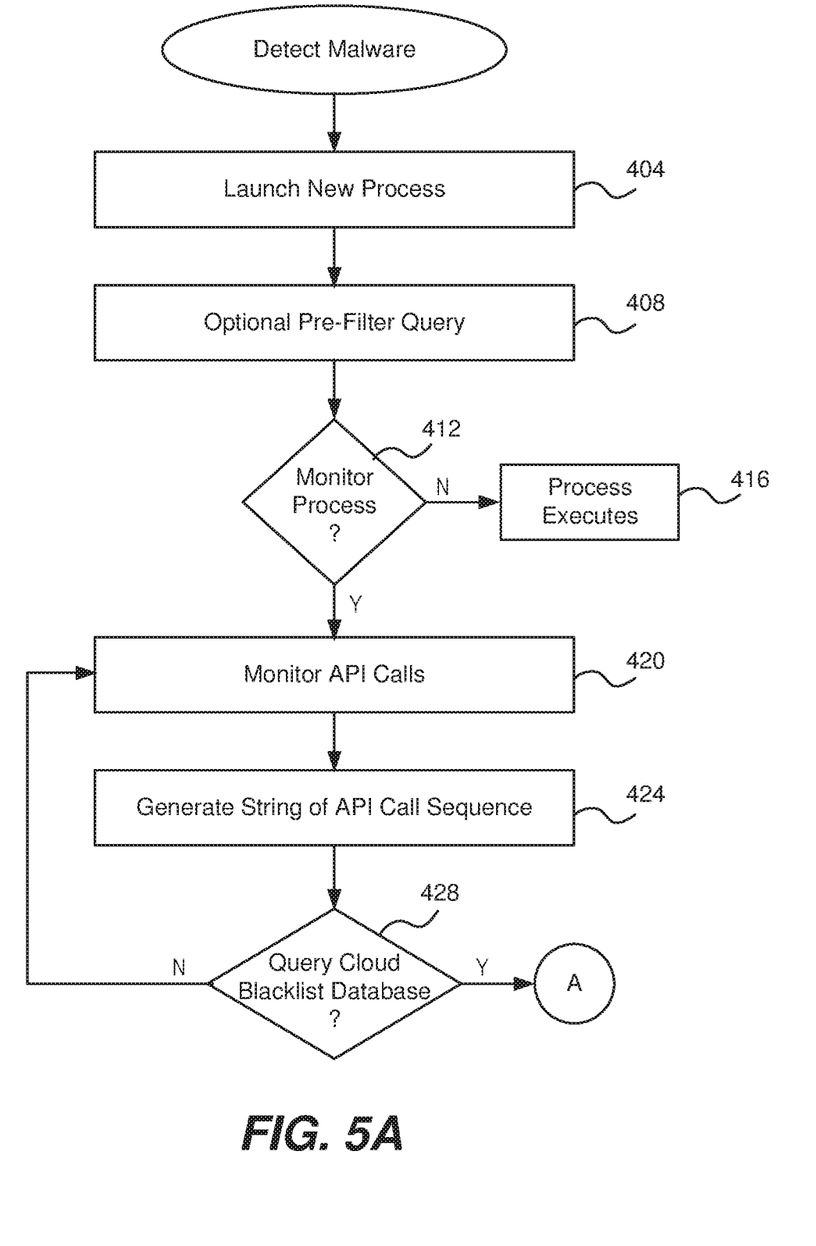
FIGS. 5A and 5B are a flow diagram describing one embodiment by which malware is detected upon a user computer using a locality-sensitive hashing algorithm.
Figure 5B:
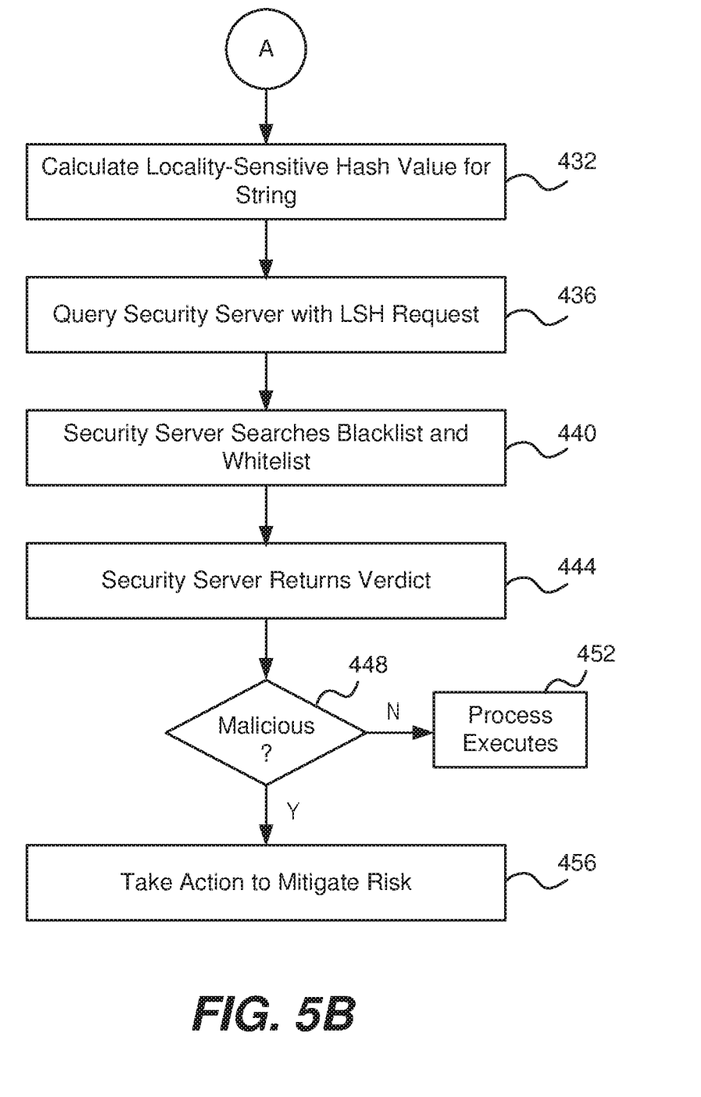

FIGS. 5A and 5B are a flow diagram describing one embodiment by which malware is detected upon a user computer using a locality-sensitive hashing algorithm. In step 404 a new process is launched (or otherwise begins executing) on user computer 100 (module 120). As mentioned above, the process is an executing Microsoft portable executable (PE) file (the subject file) which will be making API calls of any suitable Microsoft operating system during its execution. The process may be launched in any suitable manner such as execution by the user, operating system, another process, dropped by another file, etc.

In an optional step 408, pre-filtering is performed using local white list databases 110 in order to prevent false positives (module 130). As mentioned above, a suitable identifier for the PE file is calculated or obtained (such as a digest, identifier for a digitally signed file, a resource value, a fuzzy representation) and a local query 134 is performed against any of the white list databases 110. If a match is found in step 412, then the process will be allowed to execute without further monitoring or intervention (modules 136 and 146). On the other hand (or if step 408 is not performed), if no match is found then control moves to step 420. A query 132 may also be made of database 170 (instead of whitelist 110) because the cloud whitelist can be updated faster and more frequently than the local whitelist.

In step 420 API call monitoring begins for the API calls made by the executing process (module 138). Monitoring may begin as soon as the process begins executing, may be triggered by a particular API call, may begin after certain number of seconds has passed, etc. In general, monitoring begins as soon as the process is created, provided that the process does not meet the optional pre-filtering criteria (e.g., whitelists, manual exclusions like a file path, local whitelist pattern, is not signed by a trusted vendor, or matches an in the cloud whitelist entry).

In step 424, as the API calls are being monitored, the MDA places these API calls in a call sequence, basically listing them one after another in a text string of increasing length. Any consistent protocol may be used, such inserting a space or comma between each API call, not placing a character, etc. As long as the protocol is consistently used for each API call sequence of the processes being monitored on the user computer, as well as for the call sequences used to generate the white list 170 and the blacklist 180, the resultant LSH value generated from call sequence will be able to be reliably compared to the white list or to the blacklist.

For example, using the call sequence for key logging software mentioned above, the concatenated API call sequence for that executing process may be: "FindWindowA,ShowWindow,GetAsyncKeyState,SetWindowsHookEx,RegisterHotKey,Get Message,UnhookWindowsHookEx." In fact, it is not strictly necessary to use the exact name for each API call that the suspicious process makes, as long as a unique name identifier is used for each API call, and as long as that unique name or identifier is used consistently not only when strings of API calls are generated in step 424, but also when API call sequences are formed for use in generating the hash values of white list database 170 and blacklist database 180.

The TLSH algorithm, however, requires a certain amount of randomness and complexity in a string of concatenated API calls. If the string were made up of identifiers mapped to their literal values e.g., API-1, API-2, API-3, the resultant string would not contain sufficient difference in the bytes, which will result is much closer TLSH distances and reduced effectives of TLSH. Thus, even though one does not have to use the exact name of the API call (as long as you are consistent when you use another unique identifier), it is preferable to use the API calls.

In step 428 the MDA determines whether to continue monitoring and collecting API calls, in which case control returns to step 420, or whether to stop collecting and to query the blacklist database 180 at security server computer 160 using the existing API call sequence (module 140). Collection of API calls and generation of an API call sequence may continue for any desirable length of time. Collection may terminate when a particular API call has been reached (such as CreateProcessInternalW, ExitProcess, etc.) when monitoring has continued for a predetermined number of seconds, when a certain number of API calls have been added to the call sequence, or when a certain complexity of API calls have been collected. In one specific embodiment, it has been found that collecting about over 100 API calls works well. A text string containing the collected and concatenated API call sequence up to this point in time exists. When it has been determined to stop collecting API calls control then moves to step 432.

In step 432 the MDA calculates a locality-sensitive hash value from the API call sequence string. As known in the art, locality-sensitive hashing (LSH) is an algorithmic technique that hashes similar input items into the same "buckets" with high probability. The number of buckets are much smaller than the universe of possible input items. Since similar items end up in the same buckets, this technique can also be used for data clustering and nearest neighbor search. It differs from conventional hashing techniques in that hash collisions are maximized, not minimized. In one specific embodiment, the hashing algorithm that may be used is the "Trend Locality Sensitive Hash" Algorithm (TLSH algorithm) found in the GitHub repository which is known to those of skill in the art. The TLSH is also described in Oliver; et al. (2013) "TLSH—A Locality Sensitive Hash"; 4th Cybercrime and Trustworthy Computing Workshop, which is hereby incorporated by reference. The GitHub repository is a fuzzy matching library. Given a byte stream with a minimum length of 50 bytes, the TLSH algorithm generates a hash value which can be used for similarity comparisons. Similar objects will have similar hash values which allows for the detection of similar objects by comparing their hash values. Note that the byte stream should have a sufficient amount of complexity. For example, a byte stream of identical bytes will not generate a hash value. The computed hash is 35 bytes long (output as 70 hexadecimal characters). The first 3 bytes are used to capture the information about the file as a whole, while the last 32 bytes are used to capture information about incremental parts of the file. Note that the length of the hash can be increased by changing build parameters, which will increase the information stored in the hash. For some applications this might increase the accuracy in predicting similarities between files.

The TLSH algorithm is especially advantageous because it is more accurate than the other similarity algorithms mentioned above and because it can be used to perform a fast search. In other words, the similarity (determined using a distance metric or an approximate distance metric) between two TLSH values (e.g., one value in blacklist database 180 and the value calculated in step 432 can be calculated very quickly, thus allowing a user computer to query cloud computer 160 and receive a response in real time. The query can compare the calculated value with each entry in the blacklist database (numbering on the order of 100's of millions of entries) and return a verdict back to the user computer in real time in order to terminate a malicious process if necessary. As mentioned above, a locality-sensitive hash (LSH) algorithm other than TLSH may also be used.

Once the TLSH value for the call sequence string has been calculated, then in step 436 the MDA formulates a request and sends that request to security server computer 160. Preferably, the MDA invokes a Hyper Text Transfer Protocol request sent to the computer 160.

The body of the request may include any of the following attributes:
  prevalence (a census value representing how common the subject file is), a subject file that is rare may indicate a malicious file;
  maturity (a census value representing when the subject file was first seen), a subject file that has only been in existence for very short amount of time would be treated with more suspicion;
  time_landed_seconds (time for when the subject file landed), a subject file that has just arrived at the user computer would be treated with more suspicion;
  sign (common name for a digital certificate if the file is signed), a subject file that has been signed by a trusted digital certificate is less likely to be malicious file;
  api_call_sequence_tlsh, this is the TLSH value of the API call sequence as captured by the MDA;

subject_path, this is the path of the process being monitored;

subject_sha1/sha256—this is the SHA1 and SHA256 values for the process image (file) being scanned/checked;

subject_size—the size in bytes of the process being checked;

parent_process_path—the path to the parent process (the process which spawned the process being checked) of the file being checked;

parent_process_sha1/sha256—the SHA1/SHA256 of the parent process;

parent_process_size the size in bytes of the parent process image;

object_path—the path to an object (file, mutex) created by the process being checked;

object_sha1/sha256—the SHA1/SHA256 of a file created (dropped) by the process being checked; and object_size—the size in bytes of a file created by the subject process being checked.

The security server 160 may use the values of these attributes to help determine whether or not the subject file is malicious or not. Typically, these attributes help to avoid false positives. If the TLSH value of the subject file matches one of the entries in blacklist database 180, but the attribute "sign" indicates that the subject file has been signed with a digital certificate from a trusted developer, then the verdict may very well be that the file is not malicious. Typically, 50 is used for a distance threshold. Essentially, the other attributes allow for a more flexible detection logic to avoid false positives and also allow for more aggressive detection.

On the other hand, although less common, these attributes may help tip the scales toward a determination that the subject file is in fact malicious. For example, if the TLSH value of the subject file is marginally outside of a distance threshold of a known bad API Call Sequence (e.g. distance from known malicious sequence is 55 but threshold is 50), and the attribute "time landed seconds" indicates that the subject file has just arrived, and the attribute "subject path" and "parent process" indicates that the subject file has just been dropped by another file, then the determination may be made that the subject file is in fact malicious/highly suspicious. This is quite common for "loader" or "dropper" malware.

In a middle-of-the-road approach, even if a TLSH value of the subject file is not close enough to one of the entries in blacklist database 180, if enough of the above attributes indicate that the subject file should be deemed suspicious, then the security server will flag the subject file at computer 160 (and its TLSH value) indicating that the file is malicious, but will not alert the user computer that the file is malicious, indicating rather that feedback is desired from the client computer. This use of flagging and feedback will be explained in greater detail below.

In step 440 the security server searches blacklist database 180 using the received TLSH value to determine if this value matches (or is within the distance threshold) of the entries in the database. The whitelist may also be queried here as well, i.e., search the white list database 170 with the hash value to determine if the value is in that database. This checks to see if the sequence is benign at this point.

A metric distance or an approximate metric distance is used to determine if the value matches or is close. As known in the field of mathematics, a metric distance is a function that defines a distance between each pair of elements of a set. In general, a distance function is used to compare the two values. In particular, the known Hamming distance may be used as a measure to determine how close the two values are. In one specific embodiment, a distance threshold of about 50 may be used, and if the distance between two hash values is below that threshold then it may be determined that the two hash values are close enough to be considered a match. In other words, if the TLSH value from an executing process on a user computer is considered to match one of the hash values in blacklist database 180, then it may be determined that the executing process is malicious. On other hand, if the metric distance is above the distance threshold then there is no match and it may be determined that the executing process is not malicious with respect to that particular hash value the blacklist database. If that TLSH value matches one of the hash values in white list database 170, then it may be determined that the existing process is not malicious.

A fast search algorithm may also be used which means that the distance between two hash values can be calculated extremely quickly, thus allowing any user computer to perform a real-time in-the-cloud query of the databases of computer 160 while a suspicious process is executing upon a user computer, and to return a verdict to that user computer so that a malicious process may be terminated before it can do any damage. Because a metric distance is used, a decision tree may be constructed to implement the fast search as mentioned herein. As described above, FIG. 4 illustrates one example of such a decision tree implemented during fast search. Such a tree is considered "balanced" in that approximately 50% of values are left and right of a given node.

Once the distance metric has been determined in step 440 and the searches performed, the security server may also take into consideration the values of the above attributes before returning a verdict to the user computer in step 444. As explained above, the attribute values are typically used to catch false positives (i.e., return a verdict of "not malicious" even if there is a close match in step 440, as long as enough attribute values indicate that the subject file is likely not malicious), but may also be used to indicate that a subject file is malicious if a match is borderline and enough attribute values indicate that the subject file is malicious. Whether not to use the attribute values to make this determination (e.g., overrule or change the result of the search in step 440) is a design consideration that an engineer will make when taking into account the need to reduce false positives, the need to terminate a malicious processes, the impact on the user if a process is terminated, and other considerations.

Once a verdict has been determined, the security server typically returns a verdict of "0" (not malicious), a verdict of "1" (on a white list, good), a verdict of "2" (malicious), or verdict of "3" (unknown, feedback requested). The verdict will then be delivered from the security server back to the MDA on the user computer. A verdict is determined that the hash value is on a white list by also searching the white list database 170 in the cloud as well as the blacklist database 180. This type of telemetry is collected by security software—especially where the result is borderline. Backend systems make a decision based on the other factors which includes prevalence, maturity, if the file is signed, etc. It will also consider if the distance from the nearest neighbor is just outside of a threshold e.g., 60 where the distance threshold is 50. This allows the system to collect binaries which are suspicious but we are not confident enough to flag a detection.

Also, the system is non blocking, meaning the system does not block the process from executing while a query is sent, i.e., asynchronous. The backend system responds in 100's of milliseconds and the verdict determines if the MDA takes action, e.g., terminate the malicious process. There is also a timeout for the query, e.g., where no connectivity to the Internet exists. If the system was blocking and the user has a poor or no Internet connection, the process could be halted and crash.

In a next step 448 the MDA determines, based upon the returned verdict, whether the subject file is malicious or not, or is on a white list (module 142). If not malicious, then in step 452 the process is allowed to continue executing (module 146). If the subject file is malicious, then in step 456 the MDA takes any required actions in order to mitigate the security risk, such as: terminating the process, deleting (cleaning) the subject file from disk, alerting the user as to the risk, submitting a sample of the subject file back to the security server computer (or other security vendor) for further analysis.

If a verdict of "3" (unknown, feedback requested) has been returned from the security server, then the MDA is requested not to take action against the subject file (i.e., not to terminate the process nor to delete the subject file from disk), but the user will be alerted as to the possibility that the process is malicious, and the MDA is requested to return a copy of the subject file to the security server for further analysis. Accordingly, the MDA then makes a copy of the subject file and delivers it to the security server on computer 160.

Computer System Embodiment

Figure 6A:
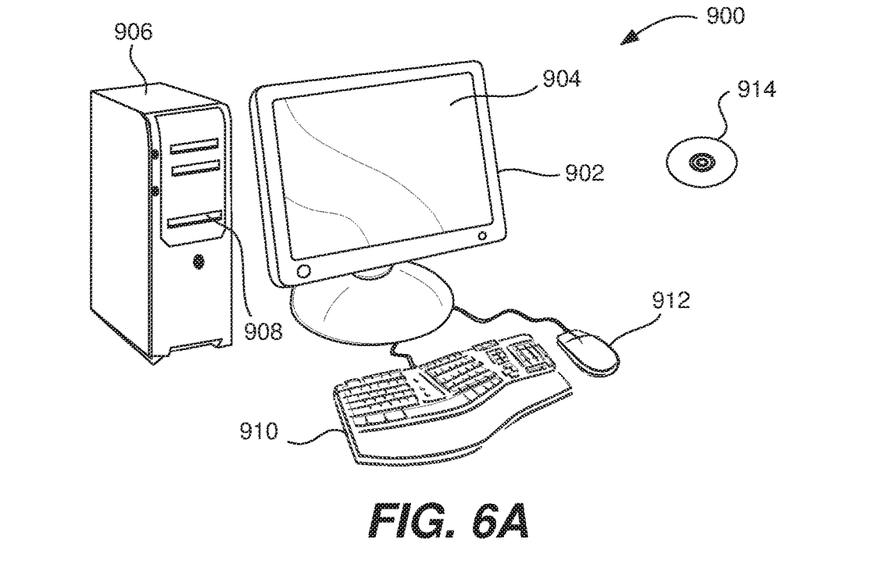
FIGS. 6A and 6B illustrate a computer system suitable for implementing embodiments of the present invention.
Figure 6B:
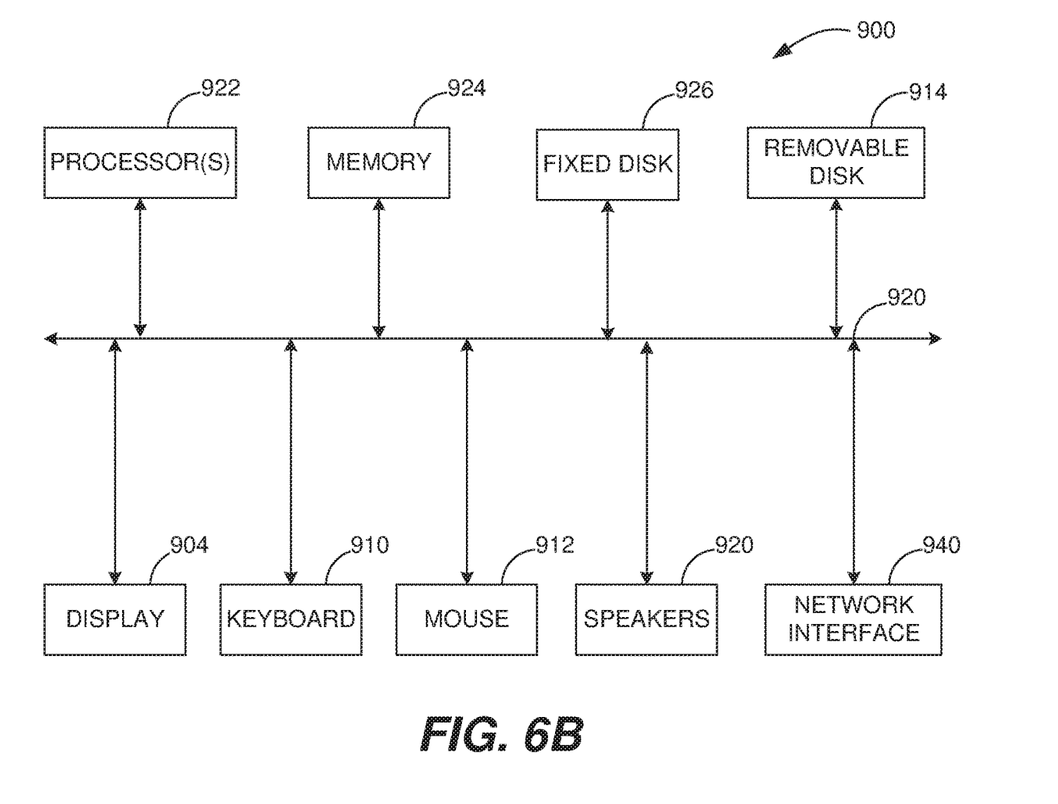

FIGS. 6A and 6B illustrate a computer system 900 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of detecting malicious software on an endpoint computer, said method comprising:
    monitoring API calls of a process executing on said endpoint computer, each API call having a unique name;
    generating a string of a plurality of said names of said API calls in order of occurrence;
    calculating a locality-sensitive hash value of said string;
    sending a query including said locality-sensitive hash value over a network from said endpoint computer to a blacklist database of a remote server computer, said blacklist database including a plurality of blacklist locality-sensitive hash values, each of said blacklist locality-sensitive hash values in said blacklist database representing a string of API calls, wherein said blacklist locality-sensitive hash values are stored in a balanced tree; and
    in response to said query, performing a search of said blacklist locality-sensitive hash values stored in nodes of said balanced tree of said blacklist database using said locality-sensitive hash value using a metric distance or an approximate metric distance and determining that said locality-sensitive hash value is similar to one of said blacklist locality-sensitive hash values in said balanced tree, wherein each node stores one of said blacklist locality-sensitive hash values, and wherein for each of said nodes other than leaf nodes numbers of said blacklist locality-sensitive hash values stored on left and right branches are approximately balanced; and
receiving, in real time, from said remote server computer an indication that said process is malicious based upon said determining.

2. A method as recited in claim 1 wherein said process is an executing version of a portable executable (PE) file.

3. A method as recited in claim 1 wherein said query includes attributes of said executing process.

4. A method as recited in claim 1 wherein said remote server computer is a cloud service.

5. A method as recited in claim 1 wherein said locality-sensitive hash values are calculated using the TLSH algorithm.

6. A method as recited in claim 1 further comprising:
terminating the collection of said names of said API calls after a length of time, after a number of API calls have been made, or when a particular API call is made.

7. A method as recited in claim 1 further comprising:
terminating said process on said endpoint computer in response to receiving said indication that said process is malicious.

8. A method of detecting malicious software on an endpoint computer, said method comprising:
receiving, at a server computer, a query over a network from a remote endpoint computer, said query including a subject locality-sensitive hash value that represents a string of ordered API calls made by an executing process on said remote endpoint computer in order of occurrence, in response to monitoring of said API calls;
accessing a blacklist database associated with said server computer, said blacklist database including a plurality of blacklist locality-sensitive hash values, each of said blacklist locality-sensitive hash values in said blacklist database representing a string of ordered API calls, wherein said blacklist locality-sensitive hash values are stored in a balanced tree;
in response to said query, performing a search of said blacklist locality-sensitive hash values stored in nodes of said balanced tree of said blacklist database using said received subject locality-sensitive hash value using a metric distance or an approximate metric distance and determining that said subject locality-sensitive hash value is similar to one of said blacklist locality-sensitive hash values, wherein each node stores one of said blacklist locality-sensitive hash values, and wherein for each of said nodes other than leaf nodes numbers of said blacklist locality-sensitive hash values stored on left and right branches are approximately balanced; and
sending, in real time, a response from said server computer to said remote endpoint computer indicating that said executing process is malicious based upon said determining.

9. A method as recited in claim 8 further comprising:
determining that said subject locality-sensitive hash value is similar to said one blacklist locality-sensitive hash value using a score that is not restricted to a range of values.

10. A method as recited in claim 8 further comprising:
determining that said subject locality-sensitive hash value is similar to said one blacklist locality-sensitive hash value when a score of said metric distance or said approximate metric distance is lower than a predetermined distance threshold.

11. A method as recited in claim 10 further comprising:
increasing said predetermined distance threshold in order to eliminate false positive results.

12. A method as recited in claim 8 wherein said locality-sensitive hash values are calculated using the TLSH algorithm.

13. A method as recited in claim 8 further comprising:
determining that at least one attribute included with said query indicates that said executing process is malicious.

14. A method of detecting malicious software on an endpoint computer, said method comprising:
generating a string of a plurality of names of API calls made by a process executing on said endpoint computer in order of occurrence in response to monitoring of said API calls;
calculating a subject locality-sensitive hash value of said string;
sending a query including said subject locality-sensitive hash value over a network from said endpoint computer to a remote server computer that includes said subject locality-sensitive hash value;
accessing, by said remote server computer, a blacklist database that includes a plurality of blacklist locality-sensitive hash values, each of said blacklist locality-sensitive hash values representing a string of API calls, wherein said blacklist locality-sensitive hash values are stored in a balanced tree;
in response to said query, performing a search of said blacklist locality-sensitive hash values stored in nodes of said balanced tree of said blacklist database using said received subject locality-sensitive hash value using a metric distance or an approximate metric distance and determining whether or not said subject locality-sensitive hash value is similar to one of said blacklist locality-sensitive hash values, wherein each node stores one of said blacklist locality-sensitive hash values, and wherein for each of said nodes other than leaf nodes numbers of said blacklist locality-sensitive hash values stored on left and right branches are approximately balanced; and
sending, in real time, a response from said remote server computer to said endpoint computer indicating whether or not said executing process is malicious based upon said determining.

15. A method as recited in claim 14 further comprising:
determining that said subject locality-sensitive hash value is similar to one of said blacklist locality-sensitive hash values;
determining that at least one attribute of said executing process included in said query indicates that said executing process is not malicious; and
sending said response to said endpoint computer indicating that said executing process is not malicious.

16. A method as recited in claim 14 further comprising:
determining that said subject locality-sensitive hash value is not similar to any of said blacklist locality-sensitive hash values;
determining that at least one attribute of said executing process included in said query indicates that said executing process is malicious; and
sending said response to said endpoint computer indicating that said executing process is malicious.

17. A method as recited in claim 15 further comprising:
determining that said subject locality sensitive hash value is similar to one of said blacklist locality-sensitive hash values because a value of said metric distance or said approximate metric distance is below a predetermined distance threshold.

18. A method as recited in claim 16 further comprising:
determining that said subject locality-sensitive hash value is not similar to one of said blacklist locality-sensitive hash values because a value of said metric distance or said approximate metric distance is above a predetermined distance threshold.

19. The method as recited in claim 14 further comprising:
determining whether or not said subject locality-sensitive hash value is similar to one of said blacklist locality-sensitive hash values by comparing a value of said metric distance or said approximate metric distance to a predetermined distance threshold.

20. The method as recited in claim 1 wherein for each of said nodes other than leaf nodes approximately 50% of said blacklist locality-sensitive hash values that are on child nodes of said each node are stored on a left branch and approximately 50% of said blacklist locality-sensitive hash values that are on child nodes of said each node are stored on a right branch.

21. The method as recited in claim 20 wherein said performing a search of said blacklist locality-sensitive hash values in said balanced tree is performed by recursively comparing said locality-sensitive hash value with one of said blacklist locality-sensitive hash values found on a node of said balanced tree, and branching down said balanced tree on said left branch or said right branch depending on a result of said comparison.

* * * * *